United States Patent [19]

Sevelinge et al.

[11] Patent Number: 4,558,551
[45] Date of Patent: Dec. 17, 1985

[54] SUPPORT STRUCTURE FOR SOLAR COLLECTOR

[75] Inventors: Gérard Sevelinge, Montceau-les-Mines; Jean-Claude Pido, Le Creusot, both of France

[73] Assignee: Creusot-Loire, Paris, France

[21] Appl. No.: 436,756

[22] Filed: Oct. 25, 1982

[30] Foreign Application Priority Data

Dec. 11, 1981 [FR] France ................. 81 23156

[51] Int. Cl.$^4$ .................. E04H 12/18; H01Q 1/12
[52] U.S. Cl. ......................... 52/646; 52/81; 126/438; 343/880; 343/915; 350/631
[58] Field of Search .................. 343/878, 880–883, 343/885, 912, 915, 916, 840; 248/466; 52/646, 648, 80, 81, DIG. 10; 126/438, 417, 424; 350/288, 289, 295, 310, 613, 631

[56] References Cited

U.S. PATENT DOCUMENTS

| | | | |
|---|---|---|---|
| 2,997,712 | 8/1961 | Kennedy | 343/912 |
| 3,105,969 | 10/1963 | Banche et al. | 343/915 |
| 3,707,720 | 12/1972 | Staehlin et al. | 343/915 |
| 3,725,946 | 4/1973 | Quequen | 343/916 |
| 3,913,105 | 10/1975 | Williamson et al. | 343/915 |

FOREIGN PATENT DOCUMENTS 1180464  6/1959  France ................. 343/915

*Primary Examiner*—Eli Lieberman
*Assistant Examiner*—Michael C. Wimer
*Attorney, Agent, or Firm*—Pollock, Vande Sande & Priddy

[57] ABSTRACT

Support structure for a solar collector consisting of two sets of bars linked by assembly nodes, a concave triangulated lattice (1) around the central node (10) positioned on the sighting axis (xx'), and a stiffening lattice (2) separated from the concave lattice (1) by struts (3, 6), the bars of the two lattices, positioned in a number of planes (P, Q, R) passing through the axis, constituting rigid half-trusses extending radially from a common central strut consisting of a column (3) positioned on the sighting axis (xx') and carrying at its ends the central nodes (10, 20) of the two sets of bars. The set of stiffening bars (2) is positioned on the outer side of the concave lattice (1) together with the central column (3), and the central node to which it is fixed consists of an extended base (20) forming an assembly component, fixed to the end of the central column (3) in a plane perpendicular to the axis and on which are arranged anchor points (21, 22, 23) for at least three pairs of bracing bars (81, 82) which meet two by two in three assembly nodes (A2, A4, A6) of the concave lattice (1) and each forming a triangle whose apex consists of the corresponding node (A2) and whose base consists of the assembly component (20) between the two anchor points (21, 22) separated from one another, to which the corresponding bars (81, 82) are attached.

4 Claims, 6 Drawing Figures

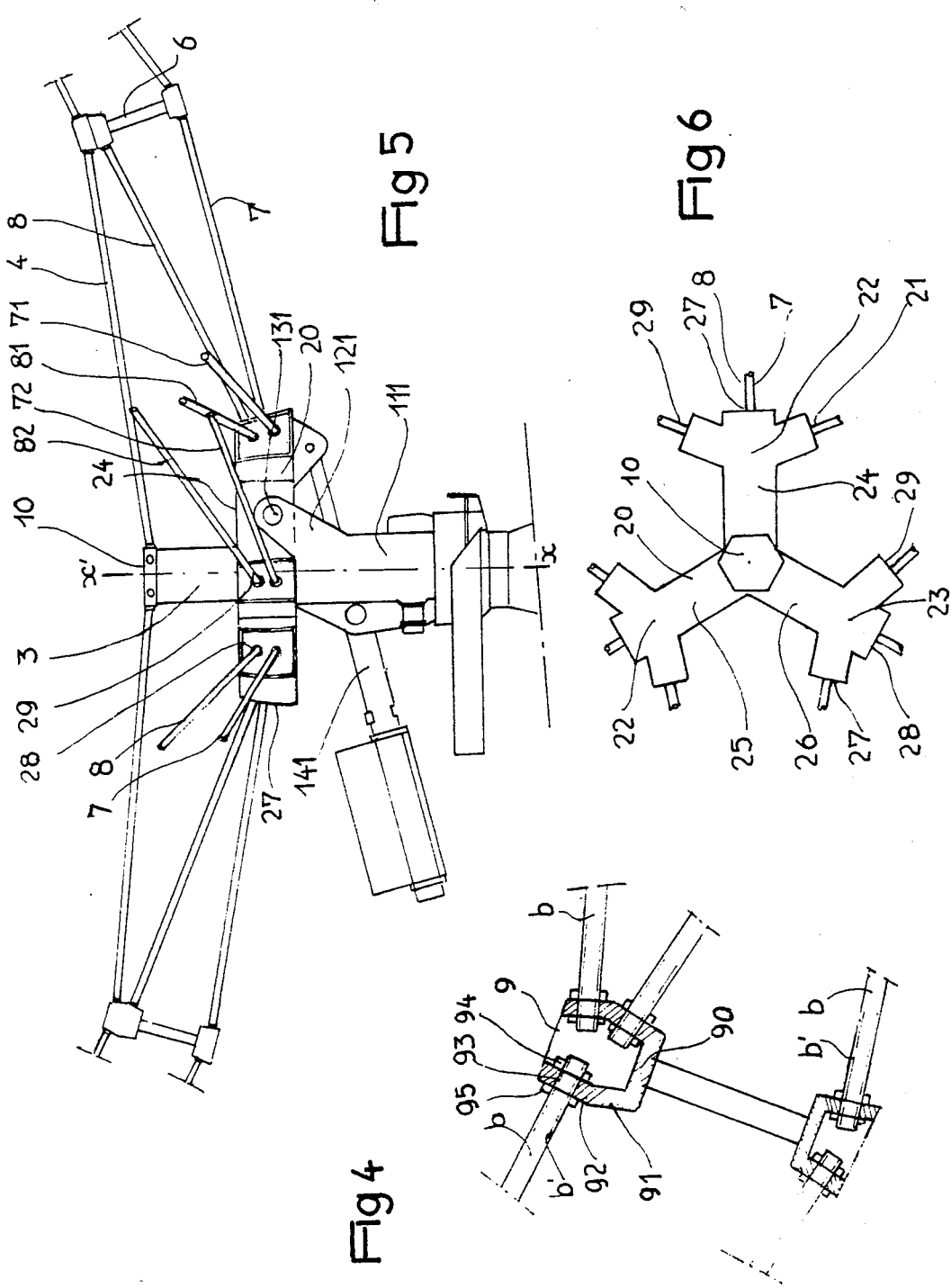

SUPPORT STRUCTURE FOR SOLAR COLLECTOR

FIELD OF THE INVENTION

The subject of the invention is a support structure for a solar collector of the type which consists of a concave mirror intended to concentrate the collected rays towards a focus where, for example, a boiler may be positioned.

The mirror has no rigidity of its own and must be positioned on a support structure, and usually this takes the form of a concave dish centered on a sighting axis and mounted so that it can articulate about an orientation axis for azimuth and about an orientation axis for elevation so as to permit the orientation of the sighting axis towards the sun to collect the maximum energy at all times.

The support structure must be rigid and must not distort in the course of time, so that the profile of the reflecting surface is preserved. In addition this rigidity must be maintained irrespective of the orientation of the sighting axis.

The support structure may be constructed of a set of sections assembled according to the conventional techniques of metal contsruction. However, due to the relatively large dimensions of a solar collector it is necessary to provide at least a facility for dismantling the structure together with the reflecting surface to enable several units which are not too bulky to be transported to the site, where they may be assembled easily.

BACKGROUND OF THE INVENTION

As solar collectors may be constructed in remote areas, to which access is often difficult, means have been sought of buidling a support structure which is easily transported and which can be assembled on site, and with this in mind, it has already been proposed to build a support structure employing a technique which is well known for scaffolding, i.e., taking the form of a set of bars linked by assembly nodes. For example, a structure of this type is described in European Patent application No. 0,025,320. In such a system, the concave dish consists of a triangular lattice which is developed around a central node positioned on the axis. According to the shape to be given to the dish, various assemblies of geometrical shapes may be envisaged, but it is advantageous for the assemblies to be constructed on a basis of triangles; it is thus possible to make a reflecting surface from triangular facets fixed to the bars.

Such a concave triangular lattice has insufficient strength of its own for the use being considered, and for this reason it is combined with a second set of stiffening bars which is also developed from a central node, and which may constitute, in several planes passing through the axis, rigid half-trusses extending radially from a common central strut consisting of a column which is positioned on the axis and which carries at its ends central assembly nodes for the two sets of bars.

It is this type of system which is described in European Patent application No. 0,025,320, mentioned above, but such a system presents a disadvantage in that the stiffening bars are positioned inside the dish which inevitably results in the reduction of the light collected due to the shadows of these bars cast on the reflecting surface. In addition, it is not easy to adapt a support system to such a structure which is capable of orientating the dish in all directions from a central pivot forming a universal articulation.

SUMMARY OF THE INVENTION

The subject of the invention is a new support structure which also consists of an assembly of bars and nodes, free of these disadvantages but possessing the desired qualities of ease of assembly and of rigidity.

According to the invention, the set of stiffening bars is positioned on the outer side of the concave lattice together with the central column, and the central node to which it is fixed consists of an extended base forming an assembly component, fixed to the end of the central column in a plane perpendicular to the axis, and on which anchor points are arranged for at least three pairs of bracing bars which meet two by two in three assembly nodes of the concave lattice situated at the apices of an equilateral triangle centered on the axis, each pair forming a triangle whose apex consists of the corresponding assembly node and whose base consists of the assembly component between the two anchor points, separated from one another, to which the corresponding bars are attached.

In a preferred embodiment, the concave lattice is developed around six inner nodes which are situated at the apices of a hexagon centered on the axis, and the assembly nodes of the bracing bars are positioned at three of the apices of the hexagon, forming an equilateral triangle, the three other apices constituting the inner nodes of three rigid half-trusses which are positioned in three radial planes passing through the axis and forming dihedral angles of 120°.

According to another characteristic, the set of stiffening bars forms an outer triangulated lattice which is developed from the assembly component and passes through six inner nodes situated at the apices of a hexagon whose radial planes pass through the six inner nodes of the concave lattice to which they are linked, two by two, by bars forming struts; the three inner nodes of the outer lattice correspond to the inner bracing nodes of the concave lattice, and are also each linked to the assembly component by a pair of bars forming a bracing triangle.

It is important to be able to adjust the profile of the reflecting surface on site, and consequently the concave lattice which supports it. To this end, according to an essential characteristic, the support structure is provided with means for adjusting the lengths of the bars, which allows the different lattice nodes to be precisely positioned.

It is preferred that each node consist of a solid piece in the form of a clamp with several faces in which holes are arranged, whose axes are orientated along the directions of the bars which terminate at the nodes.

Threaded portions arranged at the ends of the bars provide the means of adjustment for the lengths of the bars, with nuts and lock nuts screwed onto the threaded portions for locking the length of the bar at the chosen value.

BRIEF DESCRIPTION OF THE DRAWINGS

The invention will be better understood with the aid of the following description of a particular embodiment, given by way of example and illustrated in the accompanying drawings.

FIG. 4 is an axial section showing the method of fixing the bars to the nodes.

FIG. 5 is a side elevation of the central assembly component.

FIG. 6 is a plan view of the central assembly component.

DETAILED DESCRIPTION

Figure 1:
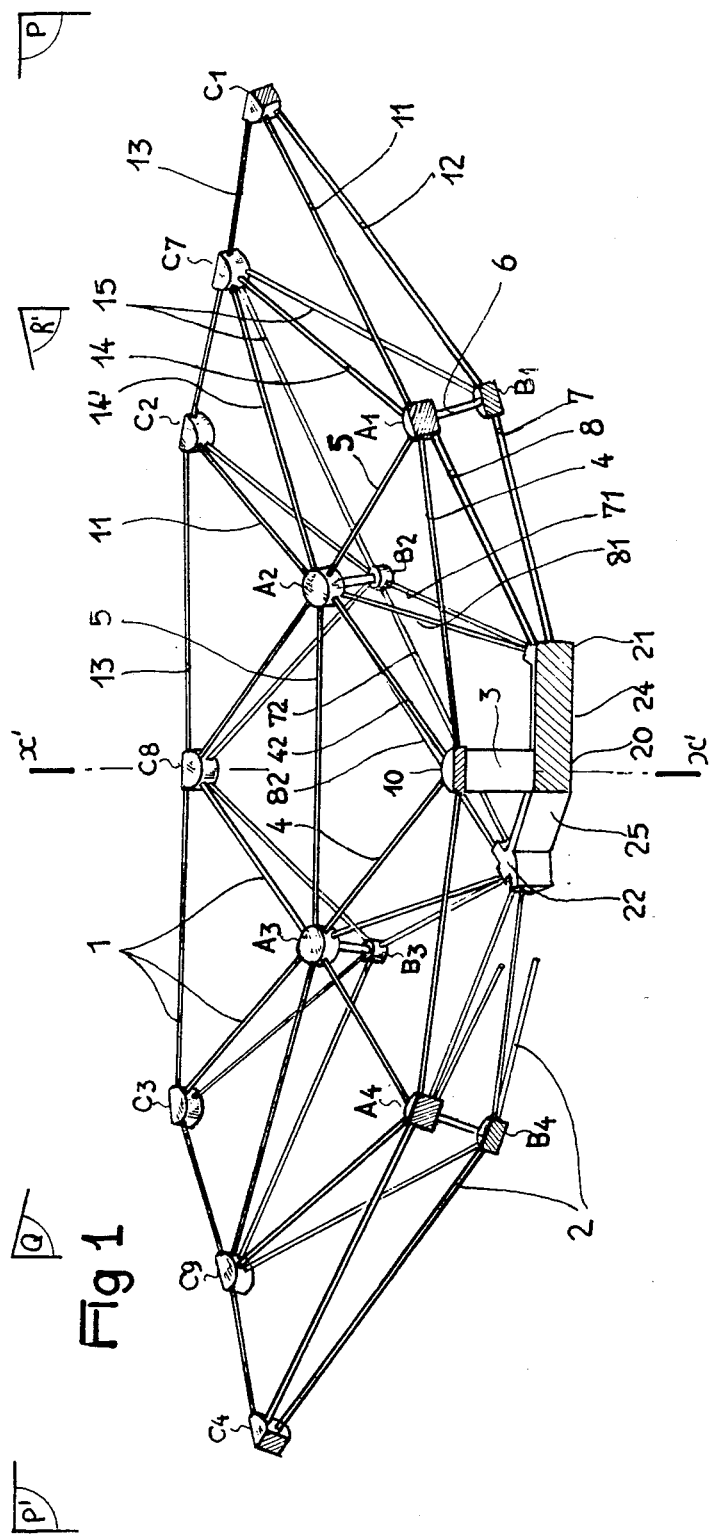
FIG. 1 shows an axial section in partial perspective of a support structure constructed according to the invention.

FIG. 1 shows an elevation of the support structure sectioned in a plane passing through the sighting axis in which the rear part is shown in perspective. The support structure consists of an inner lattice 1 and an outer lattice 2 which are developed from two central nodes 10 and 20 respectively, centered on the sighting axis XX' and linked to one another by a column 3 which lies along this axis.

Figure 2:
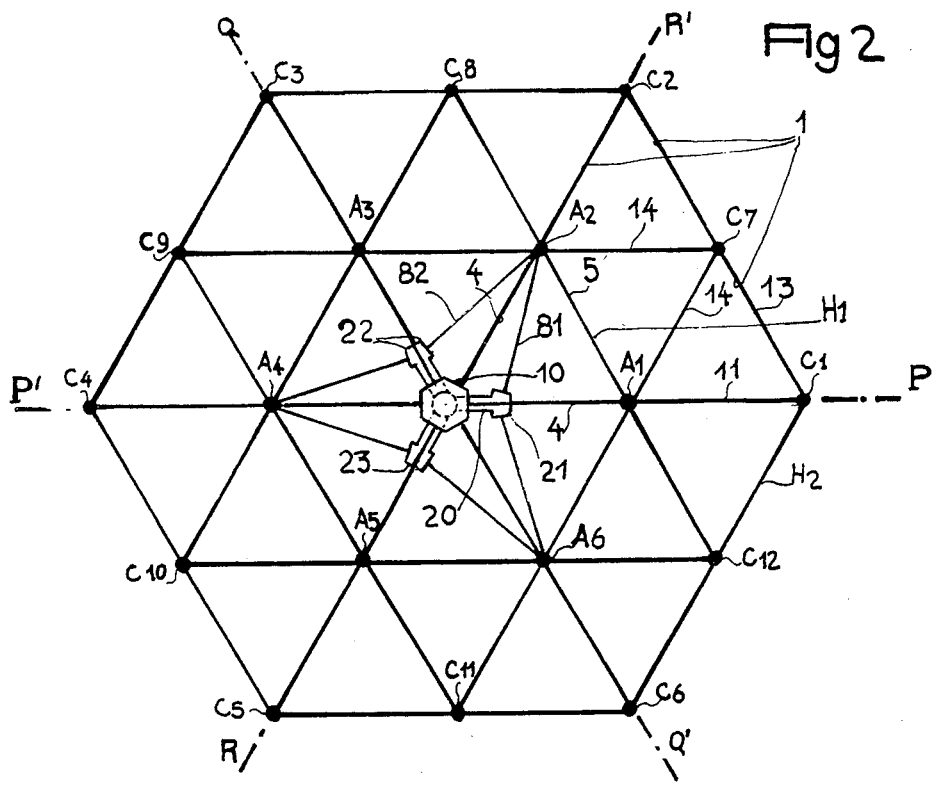
FIG. 2 is a diagrammatic plan view of the support structure.

Each lattice consists of a set of bars linked by nodes, and in FIG. 2 which is a plane view, it is seen that the nodes of the concave lattice 1 are projected on the apices of two concentric hexagons, an inner hexagon H1 and an outer hexagon H2, in such a way that the bars of the concave lattice 1 are projected on the sides of a set of equilateral triangles.

As may be seen in FIG. 1, the orientations and lengths of the bars are chosen so that, when sectioned in a plane passing through the axis, the bars of the concave lattice form the envelope of a parabola, and thus the reflecting surface takes the shape of a paraboloid which concentrates the collected rays at its focus.

The inner hexagon H1 thus passes through the inner nodes A1, A2, A3 . . . A6, while the outer hexagon H2 passes through the nodes C1, C2, C3 . . . C12.

Figure 3:
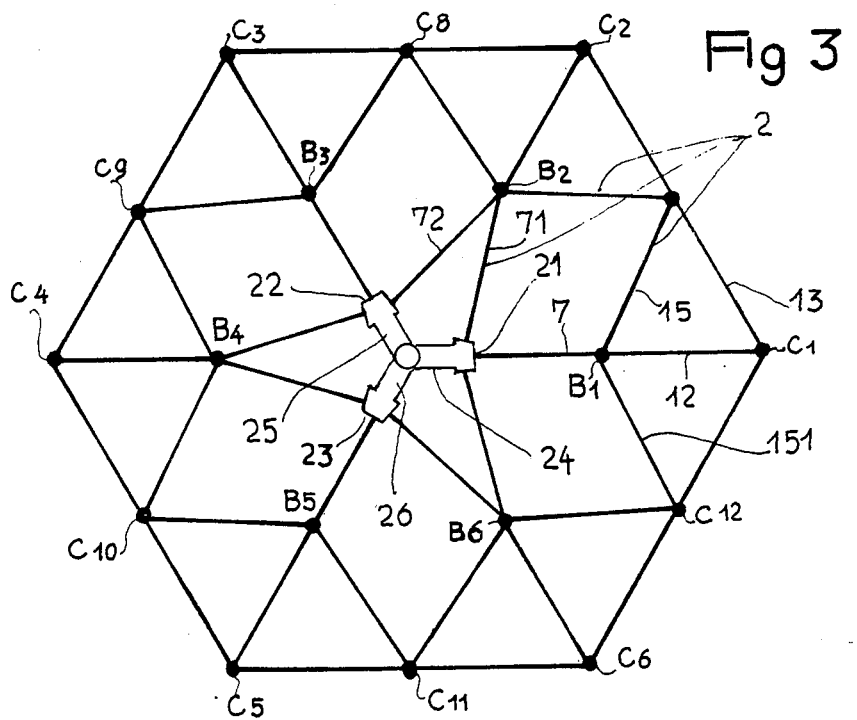
FIG. 3 is a plan view of the stiffening lattice with the concave lattice removed.

Associated with each inner node A1, A2 of the concave lattice 1 is an inner node B1, B2 of the outer lattice 2 shown in a plan view in FIG. 3. The pairs of nodes A, B are linked by the bars 6.

If the support structure is sectioned in three planes P, Q, R passing through the axis and through the three nodes A1, A3, A5 respectively so as to form dihedral angles of 120°, the bars positioned in each of these planes form three rigid half-trusses.

Thus, in the radial half-plane P which corresponds to the plane of FIG. 1 and which passes through the nodes A1, B1, C1 the set of bars linking these nodes together forms a half-truss, with the column 3 and the bar 6 as struts, which consists of the triangle 6, 11, 12 and of the quadrilateral 3, 4, 6, 7, made rigid by the diagonal bar 8 linking the central node 20 of the outer lattice 2 to the internal node A1 of the inner lattice 1.

This arrangement provides axial rigidity in the half-plane P, and the same applies in the half-planes Q and R. According to an additional characteristic of the invention, the anchor points 21, 22, 23 of the bars 7 and 8 on the central node 20 are situated as far from the axis XX' as possible in the half-planes P, Q, R and are consequently positioned at the apices of an equilateral triangle, and the central node 20 consists advantageously of three arms 24, 25, 26. The half-trusses in the planes P, Q, R may thus be given considerable inertia without lengthening unduly the central column 3.

Moreover, the three other nodes A2, A4, A6 of the inner hexagon H1 which are situated in the bisecting planes P', Q', R' of the dihedral angles formed by the half-planes P, Q, R are each linked to the two anchor points on the central node 20, positioned on either side of the said bisecting plane, by a pair of bracing bars forming an isosceles triangle whose base consists of the anchor points on the central node.

Thus the node A2 which is situated in the half-plane R' is linked to the anchor points 21, 22 by a pair of bracing bars 81, 82, respectively, which prevent its rotation about the axis xx', and the same applies to the associated node B2 of the outer lattice 2 which is likewise linked to the anchor points 21 and 22 by a pair of bracing bars 71, 72. In addition, the node A2 is linked to the central node 10 of the inner lattice 1 by a radial bar 42 which provides axial rigidity for the pair A2, B2.

The same arrangement is adopted for the node pairs A4, B4 and A6, B6 situated in the half-planes P' and Q', and like the pair A2, B2 their rotation is simultaneously prevented about the sighting axis xx' and about the axis perpendicular to the latter and to the radial half-plane in which they are situated.

The other apices A1, A3, A5 of the hexagon H1 are likewise prevented from rotating about the axis xx' by the bars 5 which form the sides of a hexagon H1 and which link each of them to the two apices either side which are themselves each prevented from rotating by a pair of bracing bars.

The outer hexagon H2 has six outer nodes at its apices C1, C2 . . . C6 and passes through six intermediate nodes C7, C8 . . . C12. All these nodes are linked to each other by bars 13 which form the sides of the hexagon H2.

Each apex such as C1 is linked to the inner node pair A1, B1, situated in the same radial half-plane, by two bars 11 and 12 which form, with the corresponding strut 6, a rigid triangle and which thus provide axial rigidity for the node C1.

Each intermediate node such as C7 is linked to each of the two inner pairs of nodes such as A1, B1 and A2, B2, situated in the half-planes P and R' on either side, by a pair of bars 14, 15 which provide its axial rigidity.

In addition, the set of triangles 5, 14, 14' and 11, 13, 14, which link two by two the inner nodes A and the outer nodes C of the concave lattice 1, and which are supported by the hexagon H1, provides the torsional rigidity of the hexagon H2.

Finally, the inner nodes B1, B3, B5 which are situated in the half-planes P, Q, R passing through the anchor points 21, 22, 23, are likewise prevented from rotating about the axis xx' by the bars 15 and 151 which link them to the intermediate nodes such as C7 and C12 situated either side of the corresponding radial half-plane and themselves prevented from rotating.

The arrangements just described which prevent the rotation of all the inner and outer nodes of the support structure about the sighting axis and about a perpendicular axis, thus ensure the axial and torsional rigidity of the latter, irrespective of its orientation, while leaving the concave side entirely free.

It will be noted that the inertia of the whole assembly in the direction of the axis xx' is a function of the distance separating the central nodes and the inner nodes, and is consequently a function of the length given to the central strut 3 and to the struts 6 situated between the inner nodes.

Moreover, the assembly is light and easily dismantled. The arrangement of the central node 20 with three arms 24, 25, 26 separated from one another enables it to be mounted easily on an articulated pivot (FIG. 5) consisting of a column 111 which is centered on the axis xx' and carries a fork 121 which articulates on one of the arms 24 of the central node 20 about an axis 131 at right angles to the axis xx'.

The column 11 is able to turn about the axis xx' and turns with it the carrying structure; the latter may be orientated about the axis 131 by a cylinder 141 whose two elements articulate, one on the column 111, and the other on the end of the arm 24.

In this way the orientation of the carrying structure in azimuth and in elevation may be simply provided.

In addition, as may be seen particularly in FIG. 6, each arm such as 24 carries at its end three anchor faces 27, 28, 29, of which one 27 is orientated in the direction of the arm 24 for fixing the bars 7 and 8 for connection to the inner nodes A1, B1 situated in the same radial half-plane P, and the other two faces are orientated towards the two inner node pairs A2, B2 and A6, B6 situated on either side of the half-plane P for fixing the bracing bars.

According to another important characteristic of the invention, the assembly of the nodes and bars is carried out in the manner shown on an enlarged scale in FIG. 4, which is a section of two inner nodes in a radial half-plane.

Each node consists of a solid metal component in the shape of a clamp 9, having a bottom 90 and a number of lateral faces 91 about a central cavity, which form facets 92 perpendicular to the axes of the bars (b) which converge into the node being considered and whose directions depend on the position of the latter. As a result of the symmetries, each type of node A, B or C can in fact take either of two forms according to whether the node being considered is situated in one of the half-planes P, Q, R or in the bisecting half-planes P', Q', R'.

Each facet 92 of the clamp 9 is provided with a hole 93 on the axis of the corresponding bar (b), and of the same diameter, into which the end (b') of the bar fits. The latter is threaded and is locked in a position which is adjusted by a nut 94 and a lock nut 95 which bear against both sides of the facet 92. After building the assembly on the site, it is then possible, by making use of a template, for example, to adjust the position of the nodes of the inner lattice 1 so as to arrange the geometry of the latter with great accuracy, which is very important for the quality of the reflector.

In the embodiment illustrated, the reflector has a parabolic shape. However, without changing the general disposition of the bars and nodes, but modifying only their lengths and orientations, it is possible to give the reflector some other shape, e.g., a spherical one.

In addition, the structure described, which consists of an inner hexagon H1 and an outer hexagon H2, is convenient for the normal dimensions of reflectors in this type of material, but it is plainly possible to utilize the same construction principle to build a larger lattice, incorporating, for example, a series of additional nodes, or having a closer triangulation.

Thus the carrying structure forming the subject of the invention is at the same time light, perfectly rigid and easily dismantled. The profile of the reflecting surface can be accurately adjusted. In addition the concave side is free of any member which would cause a shadow on the mirror, and as the whole structure is behind the mirrors, the latter are much easier to clean, particularly with an automatic device articulated about the axis of the central component.

We claim:
1. Support structure for a solar collector, comprising
 (a) two sets of bars linked by assembly nodes and forming two superposed triangulated lattices, including
  (i) an inner lattice (1) in the shape of a concave dish centered on a sighting axis (xx') and developing, around a central node (10) located on said sighting axis, from six inner nodes ($A_1 \ldots A_6$) forming an inner hexagon ($H_1$); and
  (ii) an outer lattice (2) for stiffening said inner lattice (1), located outside the latter and developing from six nodes ($B_1 \ldots B_6$) forming an outer hexagon ($H_2$), each node of said outer lattice being connected to a corresponding node ($A_1 \ldots A_6$) of said inner lattice by a spacer bar (6) forming a strut, and located in a plane passing through said sighting axis (xx'); and
 (b) an assembly component comprising
  (i) a central column (3) extending along said sighting axis (xx') and having one end fixed to said central node (10) of said inner lattice (1); and
  (ii) an enlarged base forming a central node (20) of said outer lattice (2) and constituted by three arms (24, 25, 26) fixed to the other end of said central column (3) and extending perpendicularly to said sighting axis (xx') in three radial half planes (P, Q, R) forming dihedral angles of 120° and passing respectively through a first three nodes ($A_1$, $A_3$, $A_5$) of said inner hexagon ($H_1$) and a first three nodes ($B_1$, $B_3$, $B_5$) of said outer hexagon ($H_2$);
  (iii) the three remaining nodes ($A_2$, $A_4$, $A_6$) of said inner hexagon ($H_1$) and the three remaining nodes ($B_2$, $B_4$, $B_6$) of said outer hexagon ($H_2$) being located in bisecting half planes (P', Q', R') of said dihedral angles;
 (c) each of said arms (24, 25, 26) having at its end three anchoring faces (27, 28, 29), including
  (i) a central face for anchoring two oblique bars respectively connected to said nodes ($A_1$ and $B_1$, $A_2$ $B_2$, $A_3$ and $B_3$) of said inner and outer lattices (1, 2), located in the same radial half plane of said arm; and
  (ii) two lateral faces for anchoring two bracing bars respectively connected to the other nodes of said inner and outer lattices (1, 2) respectively located in said bisecting half planes extending on both sides of the corresponding arm.

2. Support structure according to claim 1, comprising means (94, 95) for adjustment of the length of said bars, for adjustment of the positions of said nodes.

3. Support structure according to claim 1, wherein each of said nodes consists of a solid piece forming a clamp (9) having facets (92) equal in number to that of said bars (b) terminating at said node, oriented perpendicularly to the directions of said bars and provided with holes (93) for receiving ends (b') of said bars (b).

4. Support structure according to claim 3, wherein said ends (b') of said bars (b) are each threaded and locked in adjustable position on said clamp (9) by a nut (94) and a lock nut (95) screwed on said end (b') and bearing on both sides of the corresponding facet (92).

* * * * *